(12) United States Patent
Cella et al.

(10) Patent No.: US 6,630,525 B2
(45) Date of Patent: Oct. 7, 2003

(54) POLYCARBONATE-SILOXANE COPOLYMERS

(75) Inventors: James Anthony Cella, Clifton Park, NY (US); James Ross Fishburn, Menands, NY (US); James Alan Mahood, Evansville, IN (US)

(73) Assignee: General Electric Company, Niskayuna, NY (US)

( * ) Notice: Subject to any disclaimer, the term of this patent is extended or adjusted under 35 U.S.C. 154(b) by 17 days.

(21) Appl. No.: 09/972,363

(22) Filed: Oct. 9, 2001

(65) Prior Publication Data

US 2003/0105226 A1 Jun. 5, 2003

(51) Int. Cl.[7] ............... C08G 77/448; C08G 64/08; C08L 69/00
(52) U.S. Cl. .................. 524/100; 525/67; 525/147; 528/25; 528/29; 528/204
(58) Field of Search ............... 524/100; 525/67, 525/147; 528/25, 29, 204

(56) References Cited

U.S. PATENT DOCUMENTS

| | | | |
|---|---|---|---|
| 4,782,115 A | * 11/1988 | Paul | |
| 4,916,194 A | 4/1990 | Policastro et al. | |
| 4,945,147 A | 7/1990 | Policastro et al. | |
| 4,945,148 A | 7/1990 | Rich et al. | |
| 5,039,772 A | 8/1991 | Davis et al. | |
| 5,243,009 A | 9/1993 | Rich et al. | |
| 5,504,177 A | 4/1996 | King, Jr. et al. | |
| 5,530,083 A | 6/1996 | Phelps et al. | |
| 5,616,674 A | 4/1997 | Michel et al. | |
| 5,955,542 A | 9/1999 | Davis et al. | |
| 6,252,013 B1 | 6/2001 | Banach et al. | |
| 6,492,481 B1 | * 12/2002 | Davis | |

FOREIGN PATENT DOCUMENTS

WO  00/12612  * 3/2000

OTHER PUBLICATIONS

"An Improved Flame Retarded Polycarbonate", Takashi Kashiwagi & T.G. Cleary, Gary C. Davis & J.H. Lupnski, International Conf. for the Promotion of AdvancedFire Resistant Aircraft Interior Materials, Feb. 1993, pp. 1–22.

* cited by examiner

*Primary Examiner*—David J. Buttner
(74) *Attorney, Agent, or Firm*—Bernadette M. Bennett; Patrick K. Patnode

(57) ABSTRACT

A polycarbonate is provided which contains residues of a dihydric phenol, at least one comonomer of a siloxane functional bisphenol, optionally, a branching agent and optionally, a flame retardant. Further embodiments of the present invention includes a method for producing a flame retardant polycarbonate.

36 Claims, No Drawings

POLYCARBONATE-SILOXANE COPOLYMERS

BACKGROUND OF THE INVENTION

This invention belongs to the field of polycarbonates. In particular, it relates to polycarbonate-siloxane copolymers.

Historically, flame retardance systems for polycarbonate utilize low levels of additives to provide flame poisoning and anti-drip behavior. The most commonly employed flame poisons are organic bromine compounds, organophosphates, and salts of sulfonic acids. Drip inhibition is effectively provided by poly(tetrafluoroethylene), PTFE. Unfortunately, organic bromine derivatives are prohibited as eco-label additives; organophosphates are unsuitable because at the levels required for their effectiveness, they plasticize polycarbonate reducing both continuous use temperature and impact strength to impractical levels; and PTFE is unsuitable due to its crystallinity and refractive index mismatch with polycarbonate that preclude its use in transparent products. Salts of sulfonic acids provide flame retardant properties to polycarbonate in thick samples (3.2 millimeters) for normal or low flow polycarbonate, but for high flow products, they are ineffective without drip inhibitors.

Due to the restraints of flame retardant additives, it would be advantageous to have a polycarbonate with a minimum amount of flame retardant additives that also maintains transparent properties. Thus, a need exists for polycarbonates having flame retardancy and high flow while maintaining transparency.

SUMMARY OF THE INVENTION

The present invention provides a polycarbonate comprising residues of;
(a) at least one dihydric phenol; and
(b) at least one comonomer comprising a siloxane functional bis-phenol of the formula

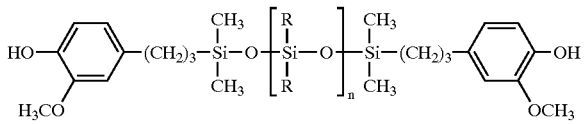

wherein R is an alkyl group, cycloalkyl group, aryl group, fluoroalkyl group, or combinations thereof and n is in a range between 0 and 20;
(c) optionally, a branching agent; and
(d) optionally, a flame retardant.

The further embodiment of the present invention includes a method for producing a flame retardant polycarbonate comprising providing:
(a) at least one dihydric phenol; and
(b) at least one comonomer comprising a siloxane functional bis-phenol of the formula

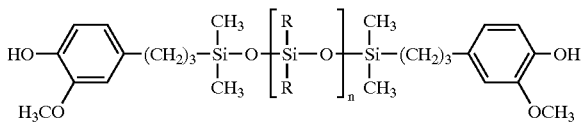

wherein R is an alkyl group, cycloalkyl group, aryl group, fluoroalkyl group, or combinations thereof and n is in a range between 0 and 20;

(c) optionally, a branching agent; and
(d) optionally, a flame retardant wherein the resulting polycarbonate is transparent.

DETAILED DESCRIPTION OF THE INVENTION

In this specification and in the claims which follow, reference will be made to a number of terms which shall be defined to have the following meanings.

The singular forms "a," "an," and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as Bisphenol A or 2,2-bis(4-hydroxyphenyl)propane.

Unless otherwise stated, "weight percent" in reference to the composition of a polycarbonate in this specification is based upon 100 weight percent of the repeating units of the polycarbonate. For instance, "a polycarbonate comprising 90 weight percent of BPA" refers to a polycarbonate in which 90 weight percent of the repeating units are residues derived from Bisphenol A or its corresponding derivative(s). Corresponding derivatives include, but are not limited to, corresponding oligomers of the diphenols; corresponding esters of the diphenol and their oligomers; and the corresponding chloroformates of the diphenol and their oligomers.

The present invention provides a polycarbonate comprising residues of;
(a) a dihydric phenol; and
(b) at least one comonomer comprising a siloxane functional bisphenol of the formula

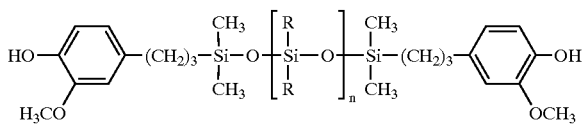

wherein R is an alkyl group, cycloalkyl group, aryl group, fluoroalkyl group, or combinations thereof and n is in a range between 0 and 20;
(c) optionally, a branching agent; and
(d) optionally, a flame retardant. Typically, R is a methyl group or a phenyl group The utilization of the above monomers provides a useful combination of flame retardancy and high flow to the polycarbonate compositions as well as transparency. As used hereinafter, the term "flame retardant" means reduced or eliminated in tendency to ignite when exposed to a low-energy flame. As used hereinafter, the term "transparent" means a maximum percent haze of 15 and a minimum percent transmission of 75. As used hereinafter, "high flow" means a melt flow index no less than about 15 grams per 10 minutes at 300° C. and 1.2 kilograms.

The siloxane functional bisphenol is typically utilized in proportions in a range between about 1 mole percent and about 10 mole percent relative to the amount of the dihydric phenol, and more typically, in a range between about 1 mole percent and about 5 mole percent of the dihydric phenol. In this regard, the use of the term "residue" denotes that portion of the molecule or moiety which remains after the polycondensation reaction has taken place.

The dihydric phenol typically used in the present invention is 2,2-bis(4-hydroxyphenyl) propane (BPA). Optionally, the polycarbonate may be further comprised of other dihydric phenol compound residues in an amount up to about 10 to 50 weight percent of the repeating units in the polycarbonate, thereby replacing the Bisphenol A, of the present invention in the total amount of dihydric phenol compounds utilized. Examples of such compounds include the following:

resorcinol
4-bromoresorcinol
hydroquinone
4,4'-dihydroxybiphenyl ether
4,4-thiodiphenol
1,6-dihydroxynaphthalene
2,6-dihydroxynaphthalene
bis(4-hydroxyphenyl)methane
bis(4-hydroxyphenyl)diphenylmethane
bis(4-hydroxyphenyl)-1-naphthylmethane
1,1-bis(4-hydroxyphenyl)ethane
1,1-bis(4-hydroxyphenyl)propane
1,2-bis(4-hydroxyphenyl)ethane
1,1-bis(4-hydroxyphenyl)-1-phenylethane
1,1-bis(3-methyl-4-hydroxyphenyl)-1-phenylethane
2-(4-hydroxyphenyl)-2-)3-hydroxyphenyl)propane
2,2-bis(4-hydroxyphenyl)butane
1,1-bis(4-hydroxyphenyl)isobutane
1,1-bis(4-hydroxyphenyl)decane
1,1-bis(3,5-dimethyl-4-hydroxyphenyl)cyclohexane
1,1-bis(3,5-dibromo-4-hydroxyphenyl)cyclohexane
1,1-bis(4-hydroxyphenyl)cyclohexane
1,1-bis(4-hydroxyphenyl)cyclododecane
1,1-bis(3,5-dimethyl-4-hydroxyphenyl)cyclododecane
trans-2,3-bis(4-hydroxyphenyl)-2-butene
4,4-dihydroxy-3,3-dichlorodiphenyl ether
4,4-dihydroxy-2,5-dihydroxy diphenyl ether
2,2-bis(4-hydroxyphenyl)adamantane
α,α'-bis(4-hydroxyphenyl)toluene
bis(4-hydroxyphenyl)acetonitrile
2,2-bis(3-methyl-4-hydroxyphenyl)propane
2,2-bis(3-ethyl-4-hydroxyphenyl)propane
2,2-bis(3-n-propyl-4-hydroxyphenyl)propane
2,2-bis(3-isopropyl-4-hydroxyphenyl)propane
2,2-bis(3-sec-butyl-4-hydroxyphenyl)propane
2,2-bis(3-t-butyl-4-hydroxyphenyl)propane
2,2-bis(3-cyclohexyl-4-hydroxyphenyl)propane
2,2-bis(3-allyl-4-hydroxyphenyl)propane
2,2-bis(3-methoxy-4-hydroxyphenyl)propane
2,2-bis(3,5-dimethyl-4-hydroxyphenyl)propane
2,2-bis(2,3,5,6-tetramethyl-4-hydroxyphenyl)propane
2,2-bis(3-5-dichloro-4-hydroxyphenyl)propane
2,2-bis(3,5-dibromo-4-hydroxyphenyl)propane
2,2-bis(2,6-dibromo-3,5-dimethyl-4-hydroxyphenyl) propane
α,α-bis(4-hydroxyphenyl)toluene
α,α,α',α'-Tetramethyl-α,α'-bis(4-hydroxyphenyl)-p-xylene
1,1-dichloro-2,2-bis(4-hydroxyphenyl)ethylene
1,1-dibromo-2,2-bis(4-hydroxyphenyl)ethylene
1,1-dichloro-2,2-bis(5-phenoxy-4-hydroxyphenyl) ethylene
4,4'-dihydroxybenzophenone
3,3-bis(4-hydroxyphenyl)-2-butanone
1,6-bis(4-hydroxyphenyl)-1,6-hexanedione
ethylene glycol bis(4-hydroxyphenyl)ether
bis(4-hydroxyphenyl)ether
bis(4-hydroxyphenyl)sulfide
bis(4-hydroxyphenyl)sulfoxide
bis(4-hydroxyphenyl)sulfone
bis(3,5-dimethyl-4-hydroxyphenyl)sulfone
9,9-bis(4-hydroxyphenyl)fluorene
2,7-dihydroxypyrene
6,6'-dihydroxy-3,3,3',3'-tetramethylspiro(bis)indane ("spirobiindane Bisphenol")
3,3-bis(4-hydroxyphenyl)phthalide
2,6-dihydroxydibenzo-p-dioxin
2,6-dihydroxythianthrene
2,7-dihydroxyphenoxathiin
2,7-dihydroxy-9,10-dimethylphenazine
3,6-dihydroxydibenzofuran
3,6-dihydroxydibenzothiophene
2,7-dihydroxycarbazole.

The dihydric phenols (which are other than BPA) may be used alone or as mixtures of two or more dihydric phenols. Further illustrative examples of dihydric phenols include the dihydroxy-substituted aromatic hydrocarbons disclosed in U.S. Pat. No. 4,217,438.

In the polycarbonates of the present invention branching agents may optionally be used and may comprise polyfunctional organic compounds containing at least three functional groups which may be hydroxyl, carboxyl, carboxylic anhydride, haloformyl and mixtures comprising at least one of the foregoing. Specific examples include trimellitic acid, trimellitic anhydride, trimellitic trichloride, tris-hydroxy phenylethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl)phenol), 4-chloroformyl phthalic anhydride, trimesic acid and benzophenone tetracarboxylic acid, and the like. Preferably, the branching agent is tris-hydroxyphenylethane (THPE). The branching agents may be added at a level in a range between about 0 mole percent and about 0.5 mole percent, and preferably in a range between about 0.1 mole percent and about 0.5 mole percent relative to the amount of dihydric phenol.

In the polycarbonates of the present invention an endcapping agent may optionally be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof. Examples of endcapping agents include, but are not limited to, phenol; p-tert-butylphenol; p-cumylphenol; p-cumylphenolcarbonate; undecanoic acid; lauric acid; stearic acid; phenyl chloroformate; t-butyl phenyl chloroformate; p-cumyl chloroformate; chroman chloroformate; octyl phenyl; nonyl phenyl chloroformate; or a mixture thereof. If present, the endcapping agent is present in amounts in a range between about 1 mole percent and about 6 mole percent, typically in a range between about 2 mole percent and about 5 mole percent, even more typically in a range between about 2 mole percent and about 4 mole percent relative to the dihydric phenol.

The method of preparation of polycarbonates by interfacial polymerization are well know; see for example the details provided in the U.S. Pat. Nos. 3,028,365; 3,334,154; 3,275,601; 3,915,926; 3,030,331; 3,169,121; and 4,188,314.

Although the reaction conditions of the preparative processes may vary, several of the preferred processes typically involve dissolving or dispersing the dihydric phenol reactant in aqueous caustic soda or potash, adding the resulting mixture with the siloxane to a suitable water immiscible solvent medium and contacting the reactants with the carbonate precursor, such as phosgene, in the presence of a suitable catalyst such as triethylamine and under controlled pH conditions, e.g., 8–10. The most commonly used water immiscible solvents include methylene chloride, 1,2-dichloroethane, chlorobenzene, toluene, and the like.

A catalyst may be employed to accelerate the rate of polymerization of the dihydroxy phenol reactant with the carbonate precursor. Representative catalysts include, but are not limited to tertiary amines such as triethylamine, quarternary phosphonium compounds, quaternary ammonium compounds, and the like. The preferred process for preparing resins of the present invention comprises the phosgenation reaction. The temperature at which the phosgenation reaction proceeds may vary from below 0° C. to about 100° C. The phosgenation reaction preferably proceeds at temperature of from room temperatures (25° C. to 50° C.). Since the reaction is exothermic, the rate of phosgene addition may be used to control the reaction temperature. The amount of phosgene required will generally depend upon the amount of the dihydric phenol reactant and the amount of siloxane also present.

Alternatively, the polycarbonate copolymer may be prepared by co-reacting in a molten state, the diphenolic monomers and a diaryl carbonate ester, such as diphenyl carbonate, in the presence of a transesterification catalyst in a Banbury mixer, twin screw extruder, or the like to form a uniform dispersion. Volatile monohydric phenol is removed from the molten reactants by distillation and the polymer is isolated as a molten residue.

Optionally, the polycarbonate may further include acrylonitrile-butadiene-styrene (ABS) copolymers, which are typically grafts of styrene or substituted styrenes and acrylonitrile or substituted acrylonitriles on a previously formed diene polymer backbone (e.g., polybutadiene or polyisoprene). The acrylonitrile-butadiene-styrene copolymer may typically be present in a range between about 3 weight percent and 30 weight percent, more typically in a range between about 3 weight percent and about 15 weight percent, and most typically in a range between about 3 weight percent and about 8 weight percent of the total composition.

Styrene and substituted styrenes are vinyl aromatic monomers having one or more alkyl, alkoxyl, hydroxyl or halo substituent groups attached to the aromatic ring, including, e.g., α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene and vinyl-substituted condensed aromatic ring structures, such as, e.g., vinyl naphthalene, vinyl anthracene, as well as mixtures of vinyl aromatic monomers.

Acrylonitriles are examples of "monoethylenically unsaturated nitrile monomers" which are acyclic compounds that includes a single nitrile group and a single site of ethylenic unsaturation per molecule. Other monoethylenically unsaturated nitrile monomers include, for example, methacrylonitrile and α-chloro acrylonitrile.

Suitable acrylonitrile-butadiene-styrene copolymers may be produced by any method known in the art. In a preferred embodiment of the present invention, a suitable ABS is a high rubber graft acrylonitrile-butadiene-styrene copolymer produced in a process which includes an emulsion polymerization step. The phrase "high rubber graft" refers generally to graft copolymer resins wherein at least about 30 weight percent, preferably at least about 45 weight percent of the rigid polymeric phase is chemically bound or grafted to the elastomeric substrate phase. Suitable ABS-type high rubber graft copolymers are commercially available from, for example, GE Plastics, Inc. under the trademark BLENDEX and include grades 131, 336, 338, 360, and 415. In another preferred embodiment of the present invention, a suitable ABS is one produced in a process which includes a mass polymerization step, so-called bulk ABS.

In addition, the present invention provides shaped, formed, or molded articles comprising the polycarbonates of the present invention.

Additives may also be added to the polycarbonate product as long as they do not adversely affect the properties of the product. These additives include a wide range of substances that are conventionally added to the polycarbonates for a variety of purposes. Specific examples include anti-drip agents, heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, inorganic fillers and any other commonly known class of additives.

Flame retardants may optionally be used in the present invention in a range between about 2 weight % and about 8 weight % relative to the amount of the total composition. Examples of flame retardants in the present invention include phosphoramides. In one embodiment, the phosphoramide comprises a compound of the formula (II):

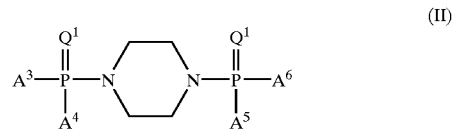

(II)

wherein each $Q^1$ is independently oxygen or sulfur; and each of $A^{3-6}$ is independently an alkyloxy, alkylthio, aryloxy, or arylthio residue, or an aryloxy or arylthio residue containing at least one alkyl or halogen substitution, or mixture thereof; or an amine residue. In a preferred embodiment each $Q^1$ is oxygen, and each $A^{3-6}$ is an aryloxy moiety with at least one aryloxy moiety having at least one substituent on an aromatic ring ortho to the oxygen linkage. In a more preferred embodiment each $Q^1$ is oxygen, and each $A^{3-6}$ moiety is independently an aryloxy moiety with at least one substituent on each aromatic ring ortho to the oxygen linkage, optionally further substituted. In a still more preferred embodiment of the present invention, each $Q^1$ is oxygen, and each $A^{3-6}$ moiety is independently an aryloxy moiety with at least two substituents on each aromatic ring ortho to the oxygen linkage, as for example a 2,6-disubstituted phenoxy moiety, optionally further substituted. Preferred substituents are $C_{1-8}$ straight-chain or branched alkyl, or halogen. In an especially preferred embodiment of the present invention, each $Q^1$ is oxygen, and each $A^{3-6}$ moiety is independently phenoxy, 2,6-dimethylphenoxy, 2,3,6-trimethylphenoxy, or 2,4,6-trimethylphenoxy. In a more especially preferred embodiment of the invention, each $Q^1$ is oxygen, and all $A^{3-6}$ moieties are phenoxy, 2,6- dimethylphenoxy, 2,3,6-trimethylphenoxy, or 2,4,6-trimethylphenoxy. These phosphoramides are piperazine-type phosphoramides.

Other flame retardants which may be used in the present invention include, for example, triphenyl phosphate (TPP), resorcinol diphosphate (RDP) and bisphenol-a-disphophate (BPA-DP); and mixtures thereof.

Such copolymers or resins described herein can be used for instance as: housings for computer equipment (monitors, CPUs, printers), electrical connectors, components or housings for telecomm equipment (cell phones, handheld devices), and other applications that could require transparency and flame retardance.

In order that those skilled in the art will be better able to practice the present invention, the following examples are given by way of illustration and not by way of limitation.

EXAMPLES

A 500 milliliter (mL) 5-neck indented wall flask was charged with 21.66 grams (g)(0.095 mol) of BPA, 0.743 g (0.004 mol) of p-cumylphenol, 2.311 g (0.005 mol) of 1,3-bis-3-(3-methoxy-4-hydroxy)phenylpropyl-1,1,3,3-tetramethyldisiloxane, 140 microliters of triethylamine (catalyst), 90 mL of water and 115 mL of methylene chloride. The flask was fitted with a gas inlet tube, condenser, pH probe, caustic inlet tube, and a stirring shaft connected to a motor. The mixture was stirred vigorously while phosgene was introduced at a rate of 0.6 g/minute. The pH was maintained at about 10.5 during the phosgene addition by metered addition of 50% sodium hydroxide (NaOH). When a total of 12.4 g (0.125 mol) of phosgene had been added, gas flow was discontinued and excess phosgene was swept out by means of a nitrogen flow. When no more phosgene or chloroformates were detected in the reaction mixture as judged by a negative test with phosgene indicator paper, the contents of the vessel were transferred to a separatory funnel. The organic phase was separated and washed with 2 volumes of 10% hydrochloric acid (HCl) and 3–5 volumes of water (until the pH of the washes were neutral). The polymer was isolated by precipitation into boiling water. This afforded about 23 g of copolymer powder which was characterized by $^1$H and $^{29}$Si nuclear magnetic resonance spectroscopy (NMR). The glass transition temperature (Tg) of the polymer was 129.5° C. Molecular weights (relative to polystyrene) were measured as: Molecular weight=45,110; Molecular number=15,456.

The copolymer powders prepared via the synthesis were first compounded on a 16 millimeter (mm) twin screw extruder with a maximum temperature of 265° C. Flame bars were injection molded at a temperature of 271 ° C. Table 1 shows the UL94 flame performance using the vertical burning (V-0/V-1) procedure. Total burn times ($t_1+t_2$) for the 5 bars plus the UL rating are listed in Table 1. Comparative sample 1 (Comp. 1) is pure polycarbonate of a similar melt flow.

The term "UL94" when used in conjunction with "flame retardant" means that a described polycarbonate composition can satisfy the UL94 requirements for V-0 flammability, as described in the "Flammability of Plastic Materials Bulletin" of Jan. 24, 1980. In this test, a 5 inch by ½ inch by 1/16 inch polycarbonate test bar containing an amount of a flame retardant additive is suspended vertically over a ¾ inch Bunsen Burner flame. A material meets requirements for a UL94 V0 rating when a test bar satisfies the following 5 tests: (1) a test bar of the material does not burn with flaming combustion for more than 10 seconds after application of a test flame, (2) no set of five test bars exhibits a total flaming combustion time exceeding 50 seconds for 10 flame applications, (3) no test bar of the material burns with flaming or glowing combustion up to the holding clamp, (4) no test bar drips flaming particles that ignite dry absorbent surgical cotton located 12 inches (305 millimeters) below the bar, and (5) no test bar exhibits glowing combustion that persists for more than 30 seconds after twice applying and removing the test flame.

Also included in Table 1 are MFI data (Melt Flow Index), percent transmission of light, and percent haze. The MFI data was measured at 300° C. with a 1.2 kilogram weight. The resin was allowed to melt for 4 minutes before testing was begun. Transmission and haze measurements were performed on 3.2 mm thick injection molded flame bars.

TABLE 1

| R | Phenyl | Phenyl | Phenyl Si-based | Methyl | Methyl | Comp. 1 |
|---|---|---|---|---|---|---|
| Branch | — | THPE | THPE | THPE | — | — |
| Total FOT (sec) | 13 | 12 | 13.3 | 17 | 20 | 49 |
| Total Drips | 0 | 0 | 0 | 0 | 0 | 5 |
| Rating | V-0 | V-0 | V-0 | V-0 | V-0 | V-2 |
| % Haze | 11.1 | 14 | — | 9.5 | 9.0 | 4.85 |
| % Transmission | 84.5 | 81.2 | — | 80.5 | 78.9 | 86.1 |
| MFI (g/10 min) | 33.4 | 21.9 | — | 28.7 | 24.5 | |

The siloxane functional monomer in these copolymers was incorporated at a level of 5 mole % relative to the BPA. If a branching agent was used, it was added at a level of 0.25 mole % relative to the BPA.

All of the copolymers showed a significant improvement in flame retardancy compared to pure polycarbonate (Comp. 1). In each case the total flame out time of the 5 bars was reduced by at least about 60%. Also, dripping was eliminated. At the same time, the percent haze and percent transmission were still useful for applications requiring transparency. Finally, the flow of all the copolymers was excellent making them useful for thin wall applications.

Example 2

Acrylonitrile-butadiene-styrene was a product called AT-07 obtained from Mitsui Toatsu. The blends of the polycarbonate-siloxane copolymers and polycarbonate/acrylonitrile-butadiene-styrene were prepared by compounding on a 20 millimeter (mm) twin screw extruder with a maximum temperature of 274° C. Flame bars were injection molded at a temperature of 290° C.

In Table 2, different types of polycarbonate-siloxane copolymers were added to a polycarbonate/acrylonitrile-butadiene-styrene formulation that contained a small amount of a phosphate flame retardant. Table 2 is the percentages of the compounds in the formulations and Table 3 is the results from the UL94 flame performance for 1.6 mm bars. The amount of phosphate was not enough to provide full flame retardancy by itself. X4PiP is tetraxylylpiperazine diphosphoramide; salt is potassium perfluorobutane sulfonate; PTFE is the anti-drip agent polytetrafluoroethylene; and samples 1, 2, 3, and 4 were made with tetramethyidisiloxane as the siloxane comonomer.

TABLE 2

|  | Sample 1 | Sample 2 | Sample 3 | Comp. 1 | Sample 4 |
|---|---|---|---|---|---|
| PC | 74.4 | 55.8 | 74.3 | 74.4 | — |
| X4PiP | 2 | 2 | 2 | 2 | — |
| ABS | 4.5 | 4.5 | 4.5 | 4.5 | 4.5 |
| PTFE | 0.5 | 0.5 | 0.5 | 0.5 | 0.5 |
| PC-Si Copolymer | 18.6 | 37.2 | 18.6 | 18.6 | 94.9 |
| Salt | — | — | 0.1 | — | 0.1 |

TABLE 3

|  | Sample 1 | Sample 2 | Sample 3 | Comp. 1 | Sample 4 |
|---|---|---|---|---|---|
| Average FOT per bar (sec) | 4.17 | 5.7 | 7.93 | 53.47 | 12.84 |
| Drip | 0 | 0 | 0 | 0 | 0 |

As can be seen in samples 1 and 2, the inclusion of the short chain copolymer (PC+tetramethyldisiloxane) provided excellent flame retardancy. However, with a longer chain copolymer (repeat unit of tetramethyidisiloxane comonomer=10), the performance was no longer V-0 (comparative sample 1). Also, the PC-siloxane copolymer could optionally also be used with other FR agents in PC/ABS blends including sulfonate salts (sample 3). Finally, the use of the PC-siloxane copolymer without the phosphate provided V-1 behavior (sample 4).

While typical embodiments have been set forth for the purpose of illustration, the foregoing descriptions should not be deemed to be a limitation on the scope of the invention. Accordingly, various modifications, adaptations, and alternatives may occur to one skilled in the art without departing from the spirit and scope of the present invention.

What is claimed is:

1. A polycarbonate comprising residues of;
   (a) at least one dihydric phenol; and
   (b) at least one comonomer comprising a siloxane functional bis-phenol of the formula

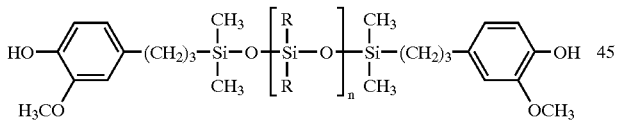

wherein R is an alkyl group, cycloalkyl group, aryl group, fluoroalkyl group, or combinations thereof and n is in a range between 0 and 20;
   (c) a branching agent wherein the branching agent is present in a range between about 0.1 mole percent about 0.5 mole percent relative to the amount of the dihydric phenol; and
   (d) optionally, a flame retardant.

2. The polycarbonate of claim 1, wherein the dihydric phenol is 2,2-bis(4-hydroxyphenyl) propane.

3. The polycarbonate of claim 1, wherein the siloxane functional bis-phenol is present in a range between about 1 mole percent and about 10 mole percent relative to the amount of the dihydric phenol.

4. The polycarbonate of claim 1, wherein the siloxane functional bis-phenol is present in a range between about 1 mole percent and about 5 mole percent relative to the amount of dihydric phenol.

5. The polycarbonate of claim 1, wherein R is a methyl group.

6. The polycarbonate of claim 1, wherein R is a phenyl group.

7. The polycarbonate of claim 1, wherein the branching agent comprises tris-hydroxyphenylethane.

8. The polycarbonate of claim 1, wherein the polycarbonate is transparent.

9. An article comprising the polycarbonate of claim 1.

10. The polycarbonate of claim 1, further comprising acrylonitrile-butadiene-styrene.

11. The polycarbonate of claim 10, wherein the acrylonitrile-butadiene-styrene is present in a range between about 3 weight percent and about 30 weight percent relative to the amount of the total composition.

12. The polycarbonate of claim 11, wherein the acrylonitrile-butadiene-styrene is present in a range between about 3 weight percent and about 15 weight percent relative to the amount of the total composition.

13. The polycarbonate of claim 12, wherein the acrylonitrile-butadiene-styrene is present in a range between about 3 weight percent and about 8 weight percent relative to the amount of the total composition.

14. The polycarbonate of claim 1, wherein the flame retardant is present in a range between about 2 weight percent and about 8 weight percent relative to the amount of the total composition.

15. The polycarbonate of claim 1, wherein the flame retardant comprises tetraxylxylpiperazine diphosphoramide.

16. The polycarbonate of claim 1, further comprising an anti-drip agent.

17. The polycarbonate of claim 16, wherein the anti-drip agent comprises polytetrafluoroethylene.

18. A polycarbonate comprising residues of;
   (a) 2,2-bis(4-hydroxyphenyl) propane; and
   (b) at least one comonomer comprising a siloxane functional bis-phenol of the formula

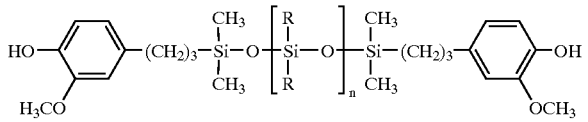

wherein R is a methyl group or phenyl group and n is in a range between 0 and 20; and
   (c) a branching agent comprising tris-hydroxyphenylethane wherein the polycarbonate is transparent.

19. An article comprising the polycarbonate of claim 18.

20. A method for producing a flame retardant polycarbonate comprising reacting:
   (a) at least one dihydric phenol; and
   (b) at least one comonomer comprising a siloxane functional bis-phenol of the formula

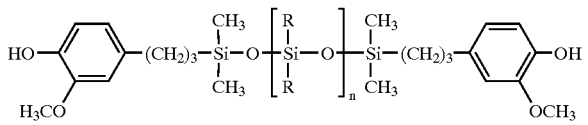

wherein R is an alkyl group, cycloalkyl group, aryl group, fluoroalkyl group, or combinations thereof and n is in a range between 0 and 20;
   (c) a branching agent wherein the branching agent is present in a range between about 0.1 mole percent about 0.5 mole percent relative to the amount of the dihydric phenol; and (d) optionally, a flame retardant
wherein the resulting polycarbonate is transparent.

21. The method of claim 20, wherein the dihydric phenol is 2,2-bis(4-hydroxyphenyl) propane.

22. The method of claim 20, wherein the siloxane functional bis-phenol is present in a range between about 1 mole percent and about 10 mole percent relative to the amount of the dihydric phenol.

23. The method of claim 20, wherein the siloxane functional bis-phenol is present in a range between about 1 mole percent and about 5 mole percent relative to the amount of dihydric phenol.

24. The method of claim 20, wherein R is a methyl group.

25. The method of claim 20, wherein R is a phenyl group.

26. The method of claim 20, wherein the branching agent comprises tris-hydroxyphenylethane.

27. The method of claim 20, further comprising acrylonitrile-butadiene-styrene.

28. The method of claim 27, wherein the acrylonitrile-butadiene-styrene is present in a range between about 3 and about 30 relative to the amount of the total composition.

29. The method of claim 28, wherein the acrylonitrile-butadiene-styrene is present in a range between about 3 and about 15 relative to the amount of the total composition.

30. The method of claim 29, wherein the acrylonitrile-butadiene-styrene is present in a range between about 3 and about 8 relative to the amount of the total composition.

31. The method of claim 20, wherein the flame retardant is present in a range between about 2 weight percent and about 8 weight percent relative to the amount of the total composition.

32. The method of claim 20, wherein the flame retardant comprises tetraxylxylpiperazine diphosphoramide.

33. The method of claim 20, further comprising an anti-drip agent.

34. The method of claim 33, wherein the anti-drip agent comprises polytetrafluoroethylene.

35. The method of claim 20, wherein the polycarbonate is transparent.

36. A method for producing a flame retardant polycarbonate comprising reacting:

(a) 2,2-bis(4-hydroxyphenyl)propane; and (b) at least one comonomer comprising a siloxane functional bis-phenol of the formula

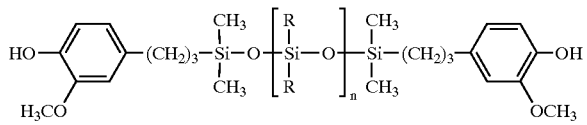

wherein R is a methyl group or phenyl group and n is in a range between 0 and 20; and (c) a branching agent comprising tris-hydroxyphenylethane
wherein the polycarbonate is transparent.

* * * * *